United States Patent
Figueras I Ventura et al.

(10) Patent No.: US 8,824,013 B2
(45) Date of Patent: Sep. 2, 2014

(54) ERROR DIFFUSION HALFTONING METHOD FOR DARK INK AND LIGHT INK CHANNELS, BASED ON A MEASURE OF SOLVENT QUANTITY THAT SHOULD BE EJECTED FOR EACH PIXEL, AND APPARATUS THAT PERFORMS THE HALFTONING METHOD

(75) Inventors: Rosa Maria Figueras I Ventura, Princeton, NJ (US); Ana Dimitrijevic, Yverdon-les-Bains (CH); Kevin Fine, Yverdon-les-Bains (CH); Serge Catarinussi, Yverdon-les-Bains (CH)

(73) Assignee: Sicpa Holding SA, Prilly (CH)

( * ) Notice: Subject to any disclaimer, the term of this patent is extended or adjusted under 35 U.S.C. 154(b) by 814 days.

(21) Appl. No.: 12/676,337

(22) PCT Filed: Sep. 3, 2007

(86) PCT No.: PCT/IT2007/000605
§ 371 (c)(1),
(2), (4) Date: Mar. 17, 2010

(87) PCT Pub. No.: WO2009/031165
PCT Pub. Date: Mar. 12, 2009

(65) Prior Publication Data
US 2010/0202023 A1 Aug. 12, 2010

(51) Int. Cl.
*H04N 1/405* (2006.01)
*H04N 1/52* (2006.01)
*B41J 2/205* (2006.01)

(52) U.S. Cl.
CPC ...................... *H04N 1/52* (2013.01)
USPC ........... 358/3.05; 358/1.1; 358/1.9; 358/3.01; 358/3.03; 358/3.06; 382/251; 382/252; 382/254; 382/275; 347/15

(58) Field of Classification Search
None
See application file for complete search history.

(56) References Cited

U.S. PATENT DOCUMENTS

| 5,963,714 A | 10/1999 | Bhattacharjya et al. |
| 6,081,344 A * | 6/2000 | Bockman et al. ............... 358/1.9 |

(Continued)

FOREIGN PATENT DOCUMENTS

| BE | EP1592226 A1 * | 5/2005 | ............... H04N 1/40 |
| EP | 0 372 826 A2 | 6/1990 | |
| EP | 1 592 226 A1 | 11/2005 | |

OTHER PUBLICATIONS

International Search Report dated Apr. 23, 2008, issued in priority International Patent Application No. PCT/IT2007/000605.

*Primary Examiner* — Quang N Vo
(74) *Attorney, Agent, or Firm* — Greenblum & Bernstein, P.L.C.

(57) ABSTRACT

An image processing method suitable for a printer unit, includes an error diffusion halftoning process arranged for quantizing and diffusing each pixel of an image including a set of subtractive primary colors (C', M', Y'), in an image including a quantized printer image including a set of ink drops ($D_C$, $D_M$, $D_Y$, $D_c$, $D_m$) of respective ink channels to be printed. The method comprises the step of determining, for each pixel, an input variable value (S) representing a measure of solvent quantity that should be ejected by the printer unit for each pixel, the input variable value being computed on the basis of the value of a corresponding pixel of the image including the set of subtractive primary colors (C', M', Y'), and of inputting the determined input variable value (S) in the error diffusion halftoning process together with the values of the corresponding pixel. The invention further relates to the apparatus embodying the method.

9 Claims, 4 Drawing Sheets

(56) References Cited

U.S. PATENT DOCUMENTS

| | | | |
|---|---|---|---|
| 6,721,063 B1* | 4/2004 | Harrington | 358/1.9 |
| 2001/0015816 A1* | 8/2001 | Metcalfe | 358/1.9 |
| 2002/0186267 A1* | 12/2002 | Velde et al. | 347/15 |
| 2003/0048315 A1* | 3/2003 | Hiramoto | 347/9 |
| 2003/0072035 A1* | 4/2003 | Hagai et al. | 358/3.03 |
| 2003/0214676 A1 | 11/2003 | Yamada et al. | |
| 2003/0218778 A1* | 11/2003 | Ohta | 358/3.04 |

* cited by examiner

| R | G | B | C | M | Y | S_C' | S_M' | S_Y' | S_tot |
|---|---|---|---|---|---|---|---|---|---|
| 0 | 0 | 0 | 136 | 136 | 136 | 136.00 | 136.00 | 136.00 | 408.00 |
| 128 | 0 | 0 | 47 | 136 | 136 | 97.38 | 136.00 | 136.00 | 369.38 |
| 255 | 0 | 0 | 0 | 136 | 136 | 0.00 | 136.00 | 136.00 | 272.00 |
| 0 | 128 | 0 | 136 | 47 | 136 | 136.00 | 97.38 | 136.00 | 369.38 |
| 128 | 128 | 0 | 47 | 47 | 136 | 97.38 | 97.38 | 136.00 | 330.75 |
| 255 | 128 | 0 | 0 | 47 | 136 | 0.00 | 97.38 | 136.00 | 233.38 |
| 0 | 255 | 0 | 136 | 0 | 136 | 136.00 | 0.00 | 136.00 | 272.00 |
| 128 | 255 | 0 | 47 | 0 | 136 | 97.38 | 0.00 | 136.00 | 233.38 |
| 255 | 255 | 0 | 0 | 0 | 136 | 0.00 | 0.00 | 136.00 | 136.00 |
| 0 | 0 | 128 | 136 | 136 | 47 | 136.00 | 136.00 | 47.00 | 319.00 |
| 128 | 0 | 128 | 47 | 136 | 47 | 97.38 | 136.00 | 47.00 | 280.38 |
| 255 | 0 | 128 | 0 | 136 | 47 | 0.00 | 136.00 | 47.00 | 183.00 |
| 0 | 128 | 128 | 136 | 47 | 47 | 136.00 | 97.38 | 47.00 | 280.38 |
| 128 | 128 | 128 | 47 | 47 | 47 | 97.38 | 97.38 | 47.00 | 241.75 |
| 255 | 128 | 128 | 0 | 47 | 47 | 0.00 | 97.38 | 47.00 | 144.38 |
| 0 | 255 | 128 | 136 | 0 | 47 | 136.00 | 0.00 | 47.00 | 183.00 |
| 128 | 255 | 128 | 47 | 0 | 47 | 97.38 | 0.00 | 47.00 | 144.38 |
| 255 | 255 | 128 | 0 | 0 | 47 | 0.00 | 0.00 | 47.00 | 47.00 |
| 0 | 0 | 255 | 136 | 136 | 0 | 136.00 | 136.00 | 0.00 | 272.00 |
| 128 | 0 | 255 | 47 | 136 | 0 | 97.38 | 136.00 | 0.00 | 233.38 |
| 255 | 0 | 255 | 0 | 136 | 0 | 0.00 | 136.00 | 0.00 | 136.00 |
| 0 | 128 | 255 | 136 | 47 | 0 | 136.00 | 97.38 | 0.00 | 233.38 |
| 128 | 128 | 255 | 47 | 47 | 0 | 97.38 | 97.38 | 0.00 | 194.75 |
| 255 | 128 | 255 | 0 | 47 | 0 | 0.00 | 97.38 | 0.00 | 97.38 |
| 0 | 255 | 255 | 136 | 0 | 0 | 136.00 | 0.00 | 0.00 | 136.00 |
| 128 | 255 | 255 | 47 | 0 | 0 | 97.38 | 0.00 | 0.00 | 97.38 |
| 255 | 255 | 255 | 0 | 0 | 0 | 0.00 | 0.00 | 0.00 | 0.00 |

ERROR DIFFUSION HALFTONING METHOD FOR DARK INK AND LIGHT INK CHANNELS, BASED ON A MEASURE OF SOLVENT QUANTITY THAT SHOULD BE EJECTED FOR EACH PIXEL, AND APPARATUS THAT PERFORMS THE HALFTONING METHOD

TECHNICAL FIELD

The present invention relates to an image processing method and apparatus, in particular to a colour image processing method and apparatus, and, more particularly, to an error diffusion image processing method and apparatus for colour printers arranged for using dark and light inks.

BACKGROUND ART

As known, images, such as charts, drawings, and pictures, may be represented as a two-dimensional matrix of picture elements (pixels).

The spatial resolution and intensity level for each pixel are chosen to correspond to the particular output device used. For example, typical computer monitors display images at 75 dots per inch (DPI) and have 256 levels of intensity for each colour channel. Such monitors use the additive primary colours, red, green, and blue (RGB), which can be combined to produce millions of colours, e.g. $256^3$.

It is also known that typical hardcopy output devices, such as inkjet printers, use subtractive primary colours, cyan, magenta and yellow (CMY), and are limited in the number n of intensity levels they can produce for each available colour ink. For each pixel or possible dot location on the printed medium they can only print n intensity levels, where n<<256. For standard three ink colour printers n=2 (zero or one dot). If the printer introduces light inks, then n=3 (no dots, one light ink dot, or one standard ink dot). Clearly, some conversion method, referred in the art as "halftoning", must be provided to convert the monitor-based version of the image (n=256 intensity levels per colour), or any other digital version of the input colour image, to the printer version (n=2 or n=3 levels per colour), while preserving the continuous tone visual perception provided by monitor images.

One major approach to halftoning is referred in the art as "error diffusion" or "error diffusion halftoning".

Error diffusion is not a point process, which means that the decision about whether or not to print a dot is based not only on the intensity of the corresponding input pixel, but also on what has happened to previously processed pixels.

From the paper An Adaptive Algorithm for Spatial Greyscale, Vol. 17 (2), pp 75-77 (1976). 1976 Society for Information Display R. Floyd and L. Steinberg, for instance, a general error diffusion method is known.

The known error diffusion method may be represented with the error diffusion diagram 10 of FIG. 1 wherein Q represents a quantizer, D a diffuser, reference numeral 12 an adder unit, reference E the error determined on the basis of the difference between input values $I_m$ to the quantizer Q and output values O from the quantizer Q.

The unit 12 of FIG. 1 adds image pixel data or input values I of a certain location to errors $E_n$ diffused on the basis of previously processed pixels so to produce in output a modified input data $I_m$. The modified input data $I_m$ enter the quantizer Q whose output O indicates which colour dots have to be printed at the corresponding location. The error or colour difference E between the input modified $I_m$ and the output O is then passed to the diffuser D which distributes it to further processed neighbouring pixels.

The diffused errors $E_n$ are, in turn, added to the next processed pixel.

The error diffusion algorithm terminates when all the image pixels have been serially processed.

The known error diffusion method, in particular, diffuses each error into a set of four surrounding pixels and it has the particular feature of processing each input colour variable (or colour channel) independently, i.e. the decision to print a dot of ink, for instance cyan, depends only on the value of the colour variable C (cyan), both at the corresponding image pixel and at the previously processed ones. The same holds for the other inks and their associated colour variable.

That means that the known Floyd and Steinberg error diffusion method provides for the same number of input and output variables.

In other words, if we are required to print on a device capable of using k different colour inks, we need to provide the Floyd-Steinberg quantizer Q with exactly k input variables obtained, for example, by a calibration process arranged for obtaining the input values I, i.e. C, M, Y colour values, according to the following general expression:

$$(C,M,Y)=fmap(R,G,B) \quad (1)$$

wherein:
C stands for dark cyan,
M for dark magenta,
Y for yellow,

According to the above expression, for each colour, the final ink quantity deposited on the printing medium is fully controlled by the corresponding input value I, i.e. C, M, Y. It is the responsibility of the printer colour calibration system (through, for instance, the colour calibration table) to provide zooming-up and conversion from the image RGB representation to the printer input variables representation ($C_1$, $C_2$, ..., $C_k$) wherein $C_i$, with i from 1 to k, are the different colour values of the input value I.

Therefore, beside the proper colour reproduction, the calibration process has the ability (and is in duty) to control, through the k variables $C_i$, the total maximum amount of ink that will be deposited on the printing medium.

This standard halftoning scheme has the advantage of being simple and reliable but it has an important drawback:
it is computationally very resource demanding.
There are two reasons for that:
first the error diffusion process has to be carried out on all the k ink colours or channels;
second, the necessary interpolations needed to calculate the input value I, i.e. $C_1, C_2, \ldots, C_k$ from the calibration table, have to be performed within a k-dimensions space.
As a matter of fact, let us first consider a printer which can use only three different colour inks, namely Cyan C, Magenta M and Yellow Y.

The very first step in the printing process will be to map the RGB colour of every input pixel into a CMY ink quantity specification, wherein each possible pixel colour must be precisely specified.

In our example, the calibration or mapping is from a 3-dimensional space (the 3D monitor device colour space) to another 3-dimensional space (the 3D printer device colour space) as already reported in expression (1).

The mapping function fmap could be given analytically through a mathematical expression, but often it is given in guise of a look-up table (LUT) where the C, M and Y quantities are numerically expressed, for instance, with eight bits each.

To avoid a lookup table with millions of entries, only a subset of the (R, G, B) to (C, M, Y) mapping points is, in general, included and the missing points are linearly interpolated from the tabulated transformations.

The process of finding a suitable mapping function fmap is named "printer calibration" and the resulting look-up table, if any, is called "calibration table". By controlling the ink quantities, the calibration table defines the colour produced on paper by a given RGB input image.

Different calibration tables must be created for each printer resolution and for every type of paper. The main reason is that printing substrates or medium (papers) have substantially different behaviours with regard to the maximum quantity of ink their can absorb.

Beyond a paper-specific threshold, hereinafter referred to as the saturation limit, the excess of ink prevents the fast drying of the paper and favours the diffusion of the dyes on the paper surface. Besides the obvious wetting effect, an excess of ink reduces the lightness and the sharpness of the printed image or document. Therefore, an important step in the calibration process consists of the definition of the said saturation limit. Physically, the saturation limit is related to the amount of liquid, or solvent, that a printing substrate can absorb and quickly evaporate. It is important to recognise that the saturation limit is not directly related to amount of dyes or to the optical density on paper. The distinction may seem somewhat pedantic as long as there is a one-to-one relation between the 'on paper' optical density and the amount of ink solvent. Unfortunately, such a relation does not exist in many cases.

Consider now, for instance, a printer which can print with saturated and non-saturated inks (also called dark and light inks respectively), typically C, M, Y, c (light cyan) and m (light magenta) inks. In that case it is wise to distinguish the amount of ink (C, M, Y, c, m) from the amount of dye (C', M', Y') which should be deposited on the paper to produce a given colour.

The calibration process, in this case, defines the amount of dye through the relation:

$$(C',M',Y') = f_{map}(R,G,B) \quad (2)$$

wherein C', M', Y' are input values I which should be deposited on the paper to produce a given colour. As easily comprehensible for a technician in the field, for each amount of dye C', M' and Y' one has:

$$C' = C + \rho_c c$$

$$M' = M + \rho_m m$$

$$Y' = Y \quad (3)$$

Where $\rho_c$ and $\rho_m$ are the optical density of the light cyan and light magenta relative to the optical densities of cyan and magenta; Y' is assumed corresponding to Y as, in general, printers, as known, are not provided with light yellow.

Preferably, typical values are $\rho_c = \rho_m = \frac{1}{3}$.

Except for the Y component, the amount of ink is not uniquely defined by the amount of dye required. In the most general case there is an infinite number of couples (C, c) which produce the required quantity of dye C'.

The special cases (C=0, c) and (C, c=0) correspond to the wettest and the driest combination, for example, of cyan inks needed to obtain the quantity C' of cyan dye. The same can be said for the magenta colour component.

As a consequence, the specification of the dyes quantities in the calibration table does not enable to control the effective amount of ink (solvent) transferred to the printing substrate.

The simplest solution to the problem consists in a calibration table which directly specifies the amount of inks instead of the amount of dyes.

$$(C,M,Y,c,m) = \text{Plight}(C',M',Y') \quad (4)$$

To that purpose, a special procedure Plight is introduced which determines the ink amounts (C, M, Y, c, m) from the dye amounts (C', M', Y'). The latter are calculated from the calibration map fmap, as shown in equation (2).

As already noted, proceeding that way has some important draw backs:

The number of elements in the calibration table is strongly increased. This will be especially true for printers capable of using five or more than five inks;

Colour interpolations, for non-tabulated RGB→CMYcm mapping, have to be performed, for example, at least in a 5-dimensions space, thus requiring much more computer resources;

The Plight procedure, which determine the actual ink amounts from the dye requirements, can be difficult to set-up. It requires a number of arbitrary decision to be taken in order to choose among the many possible mapping (C'M'Y')-->(C, M, Y, c, m) for each entry in the calibration table (see equation 4);

In the quantization process, which occurs in the error diffusion and printing process, immediately after the calibration, more variables must be treated. This can be a waste of computing resources, especially when the quantization is done with high quality error diffusion algorithms.

The hardware implementations of the printing algorithms on various printers which may use a different set of inks is very difficult. As a matter of fact, having to treat (quantize) a different number of colour variables depending on the number of inks available on the printer can require to use different hardware depending on the number of input and output to be managed.

It is, therefore, apparent a problem exists of optimising use of computer resources in case of printers which can print with saturated and non-saturated inks.

From patent publication US_2003/0214676 an image processing method and apparatus are known that try to reduce both computer resources needed for implementing the error diffusion method and the overlap of dots.

The known apparatus provides for using one or more colours for modifying the threshold level of another colour in the error diffusion halftoning process.

According to the known apparatus the different colours in output from the error diffusion are used in input to control the error diffusion halftoning process.

Such a known prior art suffers the above problem of not substantially reducing the computer resources needed to the error diffusion halftoning process.

Applicant, in general, has noted that known image processing methods do not effectively solve the problems of optimising at the same time computer resources needed for implementing the error diffusion process and the quantity of ink used for printing.

DISCLOSURE OF THE INVENTION

The object of present invention is thus to solve the problems outlined above.

According to the present invention such an object is achieved by means of an image processing method and apparatus having the features set forth in the claims that follow.

The present invention also relates to a computer program product loadable in the memory of at least one computer unit and including software code portions for performing the steps of the method of the invention when the product is run on at least one computer unit. As used here, the reference to such a computer program product is meant as equivalent to the reference to computer readable medium containing instructions for controlling a system or a device so as to co-ordinate execution of the method according to the invention.

Reference to "at least one computer unit" is meant to highlight the possibility for the method of the invention to be carried out in a decentralised manner over a plurality of computer units.

Claims are an integral part of the teaching of the present invention.

According to a preferred embodiment the image processing method provides an error diffusion halftoning process wherein input variables comprise the values of a set of subtractive primary colours and the value of a variable, called solvent S, representing a measure of the solvent quantity per optical value that is added when a drop of ink is placed in the paper or printing substrate.

The invention presents, as well, a quantizer QS, which takes as an input the four variables C', M', Y', S and decides which dots are to be printed among the available ones.

According to a further feature of present invention, the image processing method provides to control the paper wetting through a general procedure which does not interfere with the calibration process and that never changes the number of colour variables entering in the quantization process, whatever the number of colour inks used by the output device. Such a feature is achieved in the preferred embodiment by a two step operation. Firstly by introducing the new variable S, which will go through the quantization process as a normal colour component. Secondly, by providing the new quantizer QS, that will include an entry for each C', M' and Y' dye quantities as well as for the solvent variable S. The quantizer QS will have an output for each ink used in the actual printing device and will be designed in such way to choose the output depending not only on the colour requirement C', M' and Y' but on the solvent S as well.

BRIEF DESCRIPTION OF DRAWINGS

These and further features and advantages of the present invention will appear more clearly from the following detailed description of a preferred embodiment, provided by way of a non-limiting example with reference to the attached drawings, in which components designated by same or similar reference numerals or characters indicate components having same or similar functionality and construction and wherein.

BEST MODE FOR CARRYING OUT THE INVENTION

Figure 1:
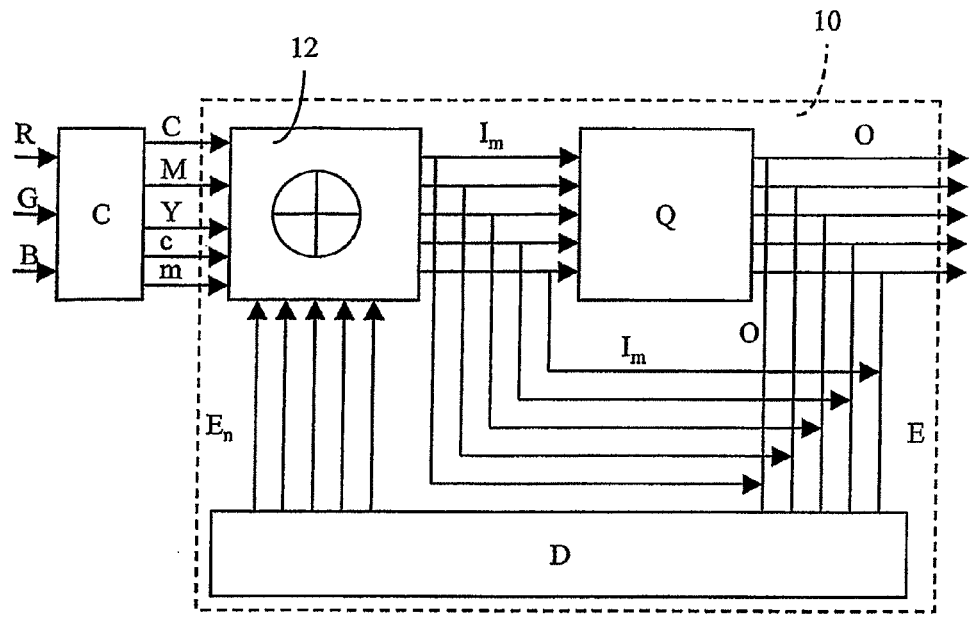
FIG. 1 shows a general block diagram for an error diffusion method according to prior art.
Figure 2:
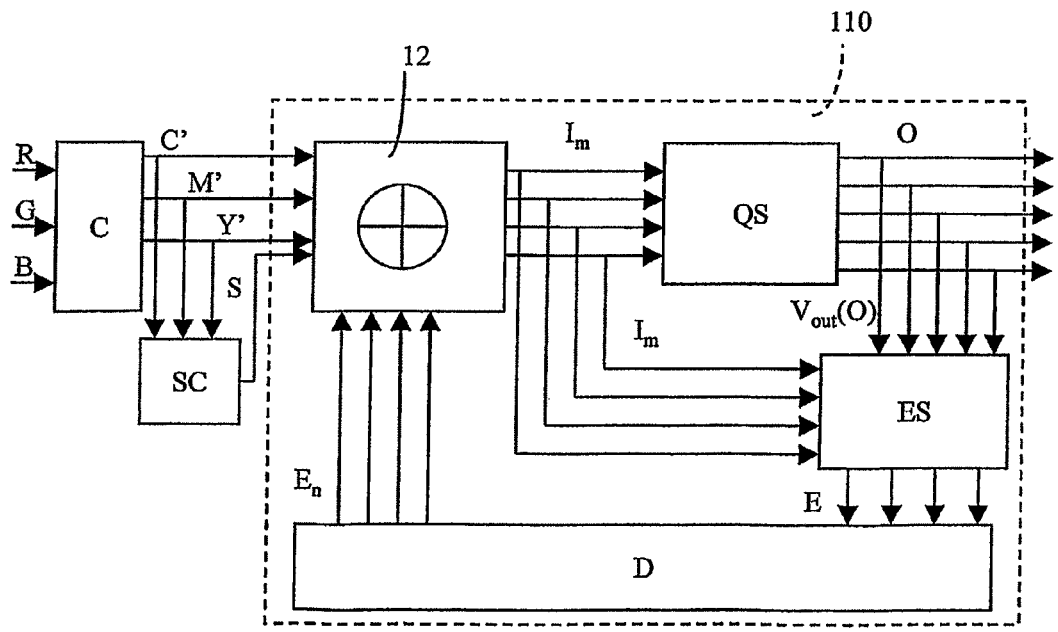
FIG. 2 shows a block diagram for an error diffusion method according to the invention.

With reference to FIG. 2 an image processing method for colour printers, according to a preferred embodiment of present invention, is represented as a block diagram comprising an error diffusion diagram 110 arranged for receiving as input the output of a conventional calibration process C, i.e. the values C', M', Y' already discussed, and a solvent variable S the value of which should be viewed as the measure of the quantity of solvent that should be placed on the paper.

According to the preferred embodiment of present invention the solvent variable S is determined by a solvent calculation block SC on the basis of values C', M', Y' as will be disclosed later on in detail.

The values of C', M', Y' and S are, according to the preferred embodiment of present invention, the set of input values I to the error diffusion diagram 110.

The error diffusion diagram 110 comprises a quantizer QS, as will be disclosed later on in detail, arranged for receiving as input a set of input values $I_m$, for instance a set of four values from an adder unit 12 of known type, and generating in output a set of output values O in a number corresponding to the number of colours or ink channels managed by the printer; for instance, according to the present preferred embodiment the set of output values O comprises five possible values $D_C$, $D_M$, $D_Y$, $D_c$, $D_m$ indicating presence or absence of a dot ink to be ejected.

In the framework of present invention the expression ink channel is used for indicating inks of different colour or different saturation degree that are available to the printer unit.

The error diffusion diagram 110 further comprises an error block ES, as will be disclosed later on in detail, arranged for determining, on the basis of the set of output values O and of the set of input values $I_m$ an error E to be diffused by means of a diffuser D, of known type.

The diffuser D is arranged for supplying, in known way, a set of error values $E_n$ to the adder unit 12 for being added to the set of input values I, i.e. to the values C', M', Y', and S.

Solvent Computation

According to the preferred embodiment the computation of the solvent quantity S is performed independently for each colour channel C', M', Y' and the final quantity S is the addition of the three obtained quantities.

Preferably, the computation of the solvent quantity S should try to maximise the usage of light inks without reaching the saturation limit. It is important as well to provide a smooth transition between the colours where light inks are predominantly used and those produced with dark inks only.

As will be apparent to a technician in the field, further methods may be used for determining the solvent quantity S wherein it could be any suitable function of the colour variables, without departing from the scope of the invention as claimed.

According to the preferred embodiment the solvent computation supposes it is optimal to use only light inks if the value to represent is smaller than a given threshold T. On the contrary, if the value to represent is bigger than this threshold, it will use more and more dark inks, replacing light dots by dark dots in the printing.

Figure 3:
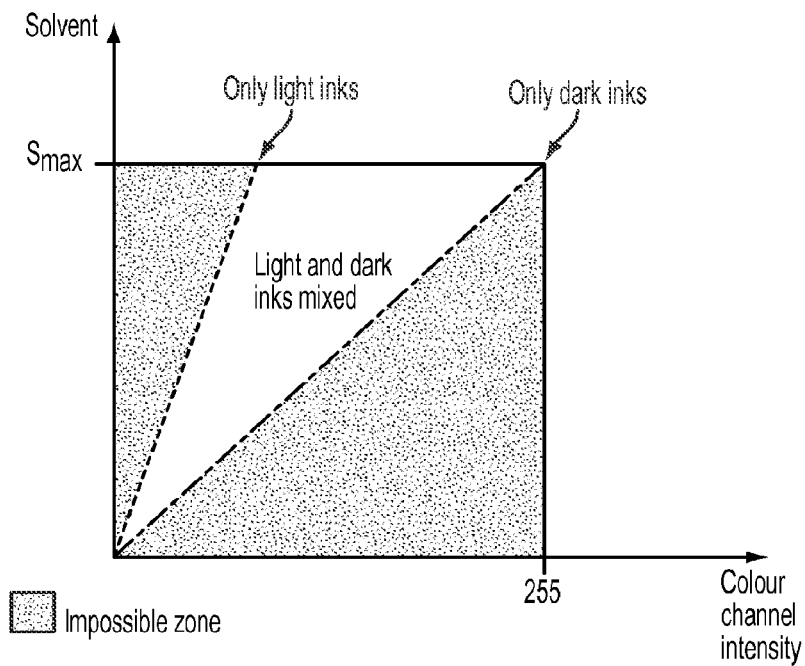
FIG. 3 represents possible solvent quantities S that are allowed to build a given colour.
Figure 4A:
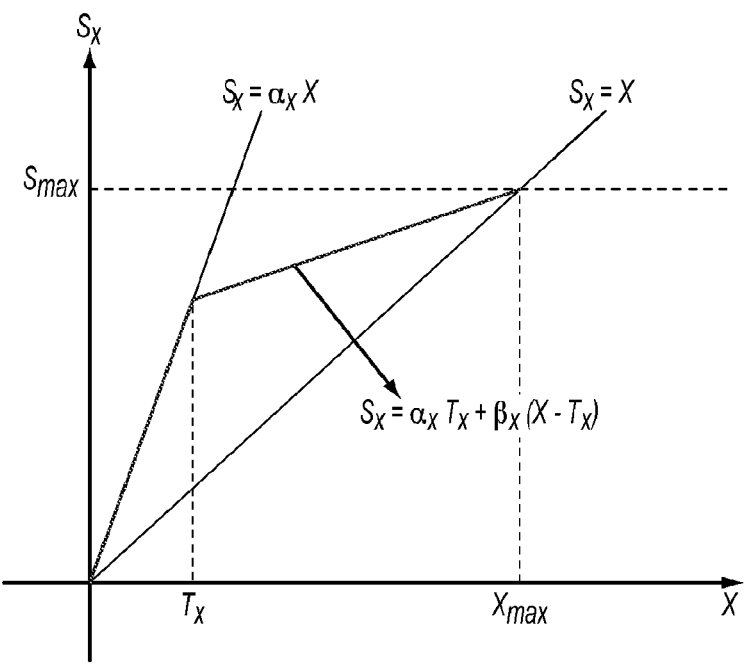
FIG. 4a represents an example of method for calculating solvent quantities S.

So, let $T_X$ be a threshold on C' and M', and X be the value of the C' or M' channels or colours as shown in FIGS. 3 and 4a, then the computation of the solvent is performed as shown in the following expression (5):

IF $X<T_X$ $$S_X=\alpha_X X \quad (5)$$

ELSE $$S_X=\alpha_X T_X+\beta_X(X-T_X);$$

wherein:
X is a colour intensity;
$T_X$ is a certain threshold;
$S_X$ is a solvent value corresponding to a certain value of X;
$X_{max}$ is the maximum colour intensity;
$S_{max}$ is the maximum solvent value for a certain paper;
$S_x$ values contained in the shaded triangular area of FIG. 4a are less or equal of $S_{max}$ values of FIG. 3;
$\alpha_x$ is the solvent quantity per optical density that a light drop of the X dye brings; and
$\beta_x$ is a percentage value obtainable as $(S_{max}-\alpha_X T_X)/(X_{max}-T_X)$ As would be clearly apparent to a technician in the field, according to further embodiments, the computation of the solvent quantity may change, according to the application, the sort of inks or other factors, such as the required visual quality and/or ink consumption.

The constants $\alpha_X$ and $\beta_X$ may depend on the channel, in order to take into account possible differences among the optical densities of colour inks.

According to the preferred embodiment, the expression (5) is only used to compute the solvent quantity of the cyan and magenta channels.
This is due to the fact that the yellow does not normally have, as already discussed, a light ink; however the solvent quantity of the yellow channel has to be taken into account in order to compute the solvent and the saturation value of the paper.

The computation of the yellow solvent quantity $S_{Y'}$ is straightforward:

$$S_{Y'}=\beta_{Y'}Y' \quad (6)$$

wherein, for example, $\beta_{Y'}$ is equal to 1.

Finally, the total solvent quantity that is placed on a paper sheet is the addition of the solvent quantities of the three different inks:

$$S=S_{C'}+S_{M'}+S_{Y'} \quad (7)$$

It should be clear that the solvent quantity S, preferably, has to be calculated from the dyes quantities C', M', Y' obtained from the calibration process described by equation (2) and shown on FIG. 2.

According to the preferred embodiment, the ink quantities C, M, Y, c, m are not known, and neither required, since their quantities are implicitly provided by the variable S(C', M', Y').

Figures 4B, 5:
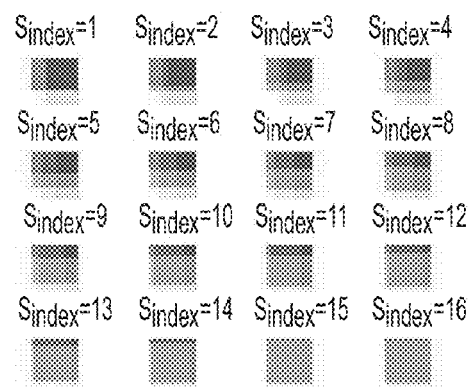
FIG. 4b represents an example of solvent calculation from RGB.
FIG. 5 represents a graphical example of a quantizer arranged for being used in the error diffusion method of FIG. 2.

In order to better clarify solvent S ($S_{tot}$) calculation starting from RGB, in FIG. 4b a reduced set of RGB values is presented. For each RGB the corresponding C', M', Y' shows he typical transformation provided by a printer calibration table. Then, for each color component, the solvent $S_{C'}$, $S_{M'}$, $S_{Y'}$ is calculated according to expression (5) and (6). Finally, the total solvent component $S_{tot}$ is calculated using expression 7. According to the example, the parameters used in the calculation are:

$$\alpha_C=\alpha_M=3$$

$$\beta_C=\beta_M=0.434 \text{ which correspond } T_C=T_M=30; \text{ and}$$

the yellow component which do not have a light ink component $$\beta_{Y'}=1 \text{ and } T_{Y'}=0.$$

The shaded columns form the final calibration table with solvent S.

Error Diffusion

As known, the error diffusion process is not a point process. It takes the decision of whether or not to print a dot according to what has happened to previously processed pixels, in such a way that the local average colour density matches the required density, wherein the required colour density is defined by the input image and the calibration function fmap; in other words, error diffusion allows to locally fulfil the colour input requirements on average, not on one single pixel.

According to the preferred embodiment of present invention the variable S is included into the error diffusion process. Once the variable S is calculated, for example as already disclosed, all we need is a quantizer QS which takes the modified input $$I_m(C'_m,M'_m,Y'_m,S_m) \quad (8)$$

wherein $C'_m$, $M'_m$, $Y'_m$ are theoretical colour values to be printed;
$S_m$ is a theoretical solvent value to be used;
and produce the output:

$$O=(D_C,D_M,D_Y,D_c,D_m) \quad (9)$$

wherein $D_C$, $D_M$, $D_Y$, $D_c$, $D_m$ ($D_X$) are real combination combinations of drops of ink to be printed or not.

As a matter of fact, the output O specifics which ink drops have to be placed at the corresponding pixel location. For instance, if a drop of ink X, corresponding to any one of colours, has to be printed, then $D_X=1$, otherwise $D_X=0$.

The error block ES is arranged:
first of all, for associating to each combination of ink drops, for example on the basis of a Look-Up Table (LUT), a value $V_{out}$ according to the following expression wherein a dye and solvent value is associated to each possible output O:

$$V_{out}(O)=(C'_o,M'_o,Y'_o,S_o) \quad (10)$$

secondly for calculating the error E, at a given pixel, between the modified input values $I_m$ and the output value $V_{out}$ by using, for example, the following expression:

$$E_X=I^X_m-V^X_{out} \quad (11)$$

wherein:
X represents the colour dyes or the solvent (C', M', Y', S); and
$E_X$ represents each component of the error E.

The error is then diffused in a known way by the diffuser D, and added to further processed pixel value. According to the preferred embodiment, the above error diffusion method has the following features which are worthy to be emphasized:

First of all, the number of input variables is, preferably, a fixed number independent of the number of output variables;

Secondly, as it should be already clear, its input variables are not related to the ink quantities, but represents the amount of dye needed to produce a required colour as obtained by a conventional calibration process, as described by equation (2) and shown on FIG. 2, with the addition of a fourth variable which controls the amount of solvent used as a dyes carrier;

Thirdly, the forth variable is, preferably, not independent of the first three. The solvent S is a function S=S(C', M', Y') of the dye variables.

The last item, in particular, has to be considered with care because it may be used for granting a further feature related to error diffusion stability problem.

As known, the whole error diffusion process works only if the input requirements can be met on a local average.

If the input I contains some impossible combination of values, the reported error will become exceedingly large and the reproduced image will, therefore, diverge from the input image. Unpredictable and very much distorted output images can be expected.

Consider the case of a constant input I having a constant component $I^X$ and assume that it is larger than any available output value $V^X_{out}$. The error $E_X$ will necessarily be positive and therefore increases the modified input $I^X_m$ value for the next processed pixel. Again, the following error $E_X$ will be necessarily positive and will clearly continue to grow for each subsequently processed pixel.

A different but equivalent view of the stability problem may be viewed by means of FIG. 3 which represents the possible solvent quantities that are allowed to build a given colour.

The solvent quantity S that will be used to build a given colour is higher if light inks are used, and lower if we use dark inks. The graphic shows the possible solvent quantities that can be placed on a paper to build a given colour. Of course, there are solvent quantities that are impossible, for example, one cannot build a very dark colour with less solvent than its input value. If the colour is entirely built with light inks, the solvent quantity increases with a slope bigger than one with respect to the colour channel intensity value. Instead, if the colour is built entirely with dark inks, the quantity of solvent to be placed on the paper is conventionally considered to be exactly the intensity of the colour channel (considering that placing a dot of dye on the paper is equivalent to placing a conventional value 255 of solvent). The computation of the solvent quantity needed to represent a given colour is then something in between, as already disclosed, closer to the light ink or dark ink curve depending on the designer preferences to favour the use of light or dark inks. As explained above, the central triangular area corresponds to all the combinations of solvent (S) and dye (Colour Channel intensity) that can be reached by combining dark (standard or saturated) and light (non-saturated) inks. The triangle corners are the three possible output value $V_{out}$ in a single colour plane. For instance, in the cyan plane, we have white, light cyan and dark cyan:

$$V_{out}(\text{white})=(0,0,0,0)$$

$$V_{out}(\text{light cyan})=(80,0,0,255)$$

$$V_{out}(\text{cyan})=(255,0,0,255) \quad (12)$$

According to the example:

for the system to be stable in the plane (C', S), the input values $I_{C'}$ must be within the triangular area bounded by the three points of equations 12;

equivalent conditions hold for stability in the plane (M', S); and in the plane (Y', S) the system is stable only if S=Y' is strictly satisfied.

According to the preferred embodiment of present invention the input values I are controlled in order that they stay into the possible ranges already defined in expression (12), i.e. the maximum values provided for $V_{out}$; such values represent the needed stability conditions for the quantizer QS.

Moreover, because in the error diffusion process the input to the quantizer unit is modified by the addition of the errors from the previously processed pixels and could be that the modified input is no more in the interval [0, 255], in our preferred embodiment, the quantizer is only defined on this range of values [0, 255], by truncating the out of range values of input $I_m$ according to the following simple rule:

IF $X<0$ $X=0$

ELSE IF $X>255$ $\quad\quad (13)$ $X=255$

ELSE $X=X$ wherein:

X represents the colour dyes or the solvent (C', M', Y', S).

Solvent Adaptive Quantizer

The error diffusion process of the present invention comprises, according to the diagram 110 (FIG. 2), a quantizer process (quantizer) QS arranged for managing, further to the variables C', M' and Y', derived by the calibration process, the disclosed variable S, which is, obviously, larger for light inks than for dark or standard inks. Therefore, according to the preferred embodiment of present invention the quantizer QS is arranged to favour the output of light inks when S is large and the output of standard inks when S is small.

In the following, we present an implementation example of a quantizer that satisfies the above conditions.

We consider a quantizer QS that takes the four modified input variables of equation (8) and generates the five output channels of equation (9).

This quantizer QS is represented graphically in FIG. 5 and could be thought as a 4-D quantizer, where the fourth dimension is the solvent value.

In order to facilitate the visualisation of such a quantizer, we will consider from now on a set of different 3-D quantizers whereof FIG. 5 shows the C', M' representation as a function of S.

In the graphical example of FIG. 5 it is assumed that the value of S ($S_{index}$) is the input to a look up table wherein on the basis of the values of $C'_m$ and $M'_m$ the output value O is obtained. For instance, if we have reached a point where the allowed solvent quantity of a given pixel is very low, we will point to a quantizer where the use of light inks is not allowed and all the colours are performed exclusively with standard inks (FIG. 5, representation with $S_{index}=1$).

On the contrary, if the solvent quantity of a given pixel is very high, the quantizer will prioritise the use of light inks, thus, will have a wide zone of light inks on it, and smaller dark inks zones (FIG. 5, representation with $S_{index}=16$).

FIG. 5 is also useful for showing how the surface ratio, of the areas that output dark and light inks, changes with the solvent value and should help to understand how the solvent variable S influences the deposition of light and dark ink drops.

As easily comprehensible for a technician in the field, the quantizer QS as disclosed is only an example of possible quantizers.

As a matter of fact, any quantizer arranged for evolving with the solvent quantity could be used without departing from the scope of the invention as claimed, provided it will fulfil the above requirements, i.e. to favour the output of light inks when S is large and the output of standard inks when S is small.

An apparatus arranged for applying the image processing method as disclosed comprises a controller board or unit for controlling a printer unit arranged for using, for instance dark and light inks.

Preferably, the controller board comprises a microprocessor arranged for storing a set of computer program modules realised during the design phase of the printing unit for implementing the image processing method as disclosed.

According to further embodiments the set of program modules may be stored partially in the controller board and partially in a computer systems connected in known way to the image processing apparatus.

According to the preferred embodiment of present invention the set of program modules comprises:

one or more calibration modules, of known type, arranged for converting additive colours into subtractive colours by means, for example, of a Look Up Table and Interpolation;

one or more modules for calculating, on the basis of the subtractive colours, a variable S suitable for supplying a measure of the quantity of solvent that should be placed on the printing medium;

one or more modules arranged for operating an error diffusion halftoning process having a limited number of inputs, for example less than or equal to four inputs including the subtractive colours and the variable S, and a number of outputs depending on the printing unit, preferably greater than the number of inputs.

The operation of such an apparatus is as follows.

Figure 6:
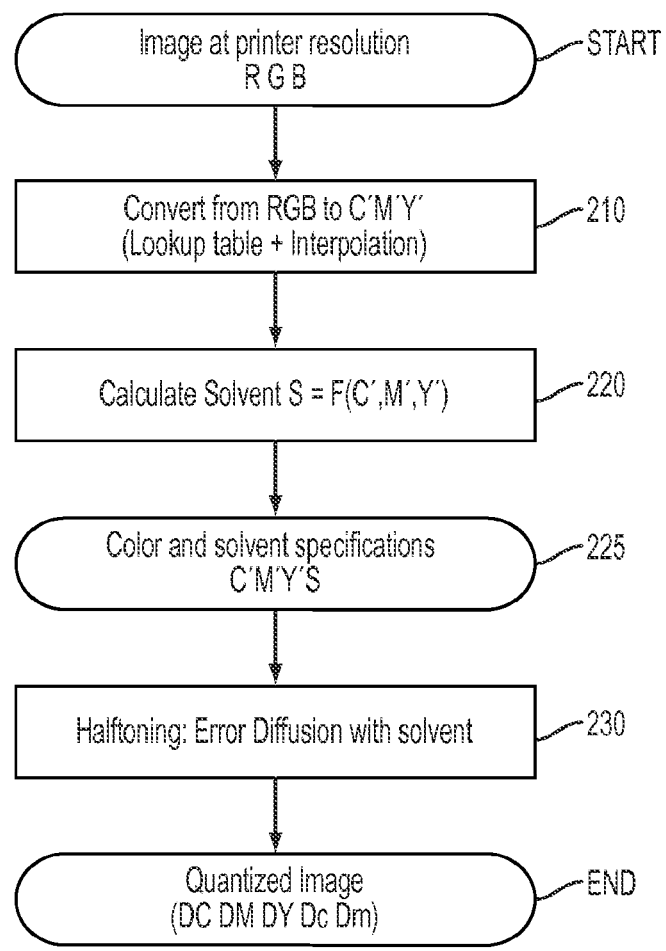
FIG. 6 shows a block diagram of an image processing method including the error diffusion method of FIG. 2.

By keeping as reference the preferred embodiment wherein it is provided a printing unit arranged for printing by using dark and light Cyan (C and c), dark and light Magenta (M and m), dark Yellow (Y):

in a first step 210 (FIG. 6), following a START step, a calibration process is provided for zooming-up and converting each pixel of an image RGB representation to the C', M', Y' representation;

in a second step 220 the values of C', M', Y' are used for determining the solvent value S; according to the preferred embodiment of present invention such a value is, by definition, comprised in a range of values which does dot exceed the maximum allowed value for a certain printing substrate or medium;

in a third step 230, following a step 225 arranged for inputting to the error diffusion process the values C', M', Y', S as input values I, the error diffusion halftoning process is arranged for quantizing and diffusing the input information I and outputting the information to be printed $O=(D_C, D_M, D_Y, D_c, D_m)$; preferably the quantizer QS is arranged for managing the solvent variable or value S as an input value to a look-up table in order to provide an output such that the quantity of ink does not exceed the maximum allowed value for a certain paper; more preferably the input values $I_m$ to the quantizer QS are limited in a range of allowed values, for instance values conventionally comprised between 0 to 255.

The operation of the apparatus is ended by outputting as END step the quantized image.

Advantageously, the image processing method, as disclosed, provides for using a predetermined limited number of input variables I to the error diffusion process.

Moreover, the input variables I are independent of the number of outputs from the error diffusion process. The limitation of the input variables provides that computer resources needed for the error diffusion process are limited both in terms of computation time and in terms of computation devices to be used. In particular, by limiting the number of input variables, for example to a predetermined number, it is possible to standardise the type of computation means and to use standardised hardware for the error diffusion process.

Advantageously, the image processing method, as disclosed, provides for using a new variable named solvent S, which, according to the preferred embodiment, is intended to be a measure of the solvent quantity per optical value that is added when a drop of ink is placed in the printing substrate. Use of the solvent variable S grants that the image processing method is intrinsically apt to control the paper wetting, i.e. the quantity of ink used for printing.

Of course, obvious changes and/or variations to the above disclosure are possible, as regards shapes, materials, components, circuit elements and connections, as well as details of circuitry, of the described construction and operation method without departing from the scope of the invention as defined by the claims that follow.

The invention claimed is:

1. An image processing method implemented in a controller unit adapted to control a printer unit, the controller unit adapted to perform an error diffusion half-toning process for quantizing and error diffusing each pixel of an image, wherein the image includes a quantized printer image (O) including a set of ink drops ($D_C, D_M, D_Y, D_c, D_m$) of respective ink channels that are a real combination of drops of ink to be printed, the method comprising:

determining for each pixel, by the controller unit, a set of dye quantities cyan, magenta, and yellow (C', M', Y') of subtractive primary colours and a further colour input variable value (S) representing a measure of solvent quantity that should be ejected by the printer unit for each set of dye quantities, the further colour input variable value (S) being computed by calculating for each dye quantity of the set of dye quantities (C', M', Y') a respective measure of solvent quantity (Sx), by limiting said respective measure of solvent quantity (Sx) to be less or equal to a maximum measure of solvent (Smax) for a certain paper and by obtaining as a final colour input variable value (S) the addition of the respective measures of the solvent quantities ($S_x$);

providing, by the controller unit, the determined further colour input variable value (S) and the set of dye quantities (C', M', Y') as a limited number of colour input variables (I) to the same error diffusion half-toning process;

adding error output values (E) to said limited number of input variables in the error diffusion process to generate values of a limited number of modified input variables (Im);

quantizing (QS), by the controller unit within said error diffusion half-toning process, said limited number of modified input variables (Im), said further colour ($s_{index}$) being used as an input for a look up table whereon on the basis of the values of the modified input variables ($C'_m, M'_m$) a quantized printer image (O) including a set of ink drops ($D_C, D_M, D_Y, D_c, D_m$) of respective ink channels used in the actual printing device is obtained.

2. The image processing method according to claim 1, wherein said error diffusion half-toning process further comprises:

converting the quantized printer image (O) into output values ($V_{out}(O)$) by using a look-up table arranged to associate each combination of ink drops of said quantized printer image (O) to a set of dye quantities ($C'_o, M'_o, Y'_o$) and a further color input variable ($S_o$) representing a measure of solvent;

generating error output values (E) having said limited number of colour input variables (I) by comparing respectively said output values (Vout(O)) and the values of the limited number of modified input variables (Im).

3. The image processing method according to claim 1, further comprising:

receiving the image including a set of values of additive primary colours Red, Green, Blue (R, G, B) for each pixel and converting it to an image including the set of dye quantities (C', M', Y') of subtractive primary colours for each pixel.

4. The image processing method according to claim 1, wherein said error diffusion half-toning process comprises the step of:

outputting a quantized printer image including dots of dark and light inks ($D_C$, $D_M$, $D_Y$, $D_c$, $D_m$).

5. The image processing method according to claim 1, wherein said quantizer process (QS) further comprises:

truncating the modified input values into a range of admissible values for a colour input variable value (Sm) and for values of a set of dye quantities ($C_m'$, $M_m'$, $Y_m'$) of subtractive primary colours.

6. The image processing method according to claim 1, wherein said set of dye quantities (C', M', Y') of subtractive primary colours and said further colour input variable (S) determine said limited number of colour input variables (I) which is independent of the number of ink channels ($D_C$, $D_M$, $D_Y$, $D_c$, $D_m$) to be printed.

7. The image processing method according to claim 6, wherein said limited number of colour input variables (I) is less than or equal to 4.

8. A controller unit for a printer unit, comprising a controller unit connectable to the printer unit and adapted to control ink ejection by the printer unit, said controller unit comprising a microprocessor storing program modules adapted to perform the method of claim 1.

9. A non-transitory computer readable medium including software code portions arranged to perform, when run on at least one computer, the method according to claim 1.

* * * * *

UNITED STATES PATENT AND TRADEMARK OFFICE
CERTIFICATE OF CORRECTION

| | | |
|---|---|---|
| PATENT NO. | : 8,824,013 B2 | Page 1 of 1 |
| APPLICATION NO. | : 12/676337 | |
| DATED | : September 2, 2014 | |
| INVENTOR(S) | : Rosa Maria Figueras I Ventura et al. | |

It is certified that error appears in the above-identified patent and that said Letters Patent is hereby corrected as shown below:

On the Title Page, at Item (73) Assignee, of the printed patent, "Sicpa Holding SA" should read --SICPA HOLDING SA--.

Signed and Sealed this
Ninth Day of June, 2015

Michelle K. Lee
*Director of the United States Patent and Trademark Office*